US012330224B2

United States Patent
Brodski et al.

(10) Patent No.: US 12,330,224 B2
(45) Date of Patent: Jun. 17, 2025

(54) CUTTING HEAD HAVING TIP PORTION WITH RADIALLY EXTENDING FRONT CUTTING EDGES PROVIDED WITH BOTH NEGATIVE AND POSITIVE RAKE ANGLES, AND ROTARY CUTTING TOOL

(71) Applicant: Iscar, Ltd., Tefen (IL)

(72) Inventors: Arie Brodski, Nesher (IL); David Ben Harouche, Nahariya (IL); Anatoly Yanovski, Maalot (IL)

(73) Assignee: Iscar, Ltd., Tefen (IL)

( * ) Notice: Subject to any disclaimer, the term of this patent is extended or adjusted under 35 U.S.C. 154(b) by 538 days.

(21) Appl. No.: 16/564,260

(22) Filed: Sep. 9, 2019

(65) Prior Publication Data

US 2020/0108449 A1   Apr. 9, 2020

Related U.S. Application Data

(60) Provisional application No. 62/741,000, filed on Oct. 4, 2018.

(51) Int. Cl.
*B23B 51/02* (2006.01)
*B23B 51/00* (2006.01)

(52) U.S. Cl.
CPC .......... *B23B 51/0003* (2022.01); *B23B 51/02* (2013.01); *B23B 2251/02* (2013.01);
(Continued)

(58) Field of Classification Search
CPC .......... B23B 2251/02; B23B 2251/046; B23B 2251/04; B23B 2251/085;
(Continued)

(56) References Cited

U.S. PATENT DOCUMENTS 6,916,139 B2 *   7/2005   Yanagida ............... B23B 51/02
                                                            408/230
7,168,893 B2 *   1/2007   Takiguchi ......... B23B 51/00035
                                                            408/233
(Continued)

FOREIGN PATENT DOCUMENTS

DE   102017201684 A1 *   8/2018
JP      07040119 A   *   2/1995
(Continued)

OTHER PUBLICATIONS

Tool and Manufacturing Engineers Handbook, 4th Ed., Drozda et al., pp. 10-32 to 30-34 (1983).*
(Continued)

*Primary Examiner* — Ryan Rufo
(74) *Attorney, Agent, or Firm* — Womble Bond Dickinson (US) LLP

(57) ABSTRACT

A cutting head rotatable about a first axis, comprising an intermediate portion and a tip portion. The intermediate portion has a plurality of leading edges defining a cutting diameter, and the tip portion has an axially forwardmost tip point and a plurality of front surfaces with outer and inner cutting edges. An outer rake surface adjacent to each outer cutting edge has a positive outer rake angle, and an inner rake surface adjacent to each inner cutting edge has a negative inner rake angle. Each outer rake surface is disposed on a head flute intersecting one of the leading edges, and each inner rake surface is disposed on a gash intersecting one of the head flutes. Each gash extends to a gash path end point located a first distance axially rearward of the tip point, and the first distance is greater than thirty percent of the cutting diameter.

22 Claims, 5 Drawing Sheets

(52) U.S. Cl.
CPC ..... *B23B 2251/04* (2013.01); *B23B 2251/047* (2022.01); *B23B 2251/182* (2022.01); *B23B 2251/202* (2013.01); *B23B 2251/241* (2013.01)

(58) Field of Classification Search
CPC .......... B23B 2251/082; B23B 2251/14; B23B 2251/18; B23B 2251/202; B23B 2251/241; B23B 2251/245; B23B 2251/406; B23B 51/02; B23B 51/0003; B23C 220/02; B23C 220/74
See application file for complete search history.

(56) References Cited

U.S. PATENT DOCUMENTS

| | | | | |
|---|---|---|---|---|
| 7,625,161 | B1* | 12/2009 | Ruy Frota de Souza | ................... B23B 51/06 407/34 |
| 7,909,549 | B2* | 3/2011 | Kondoh | ................... B23B 35/00 408/230 |
| 8,292,555 | B2* | 10/2012 | Shaffer | ................... B23B 51/02 408/230 |
| 8,342,781 | B2* | 1/2013 | Soittu | ................... B23B 51/02 408/230 |
| 8,579,557 | B2* | 11/2013 | Arai | ................... B23B 51/02 408/230 |
| 8,801,344 | B2* | 8/2014 | Krenzer | ................... B23B 51/02 408/230 |
| 9,114,461 | B2* | 8/2015 | Olsson | ................... B23B 51/02 |
| 9,156,095 | B2* | 10/2015 | Harif | ................... B23B 51/02 |
| 10,052,698 | B2* | 8/2018 | Guter | ................... B23B 51/02 |
| 10,576,552 | B2* | 3/2020 | Jäger | ................... B23B 51/02 |
| 10,882,121 | B2* | 1/2021 | Nishikoori | ............. B23B 35/00 |
| 11,117,200 | B2* | 9/2021 | Bonfiglio | ................ B23B 51/02 |
| 11,311,948 | B2* | 4/2022 | Johansson | ............... B23B 51/02 |
| 2010/0316456 | A1* | 12/2010 | George | ................... B23B 51/02 451/48 |
| 2011/0085868 | A1* | 4/2011 | Harouche | ............... B23B 51/02 408/229 |
| 2012/0155978 | A1* | 6/2012 | Osawa | .................... B23B 51/02 408/200 |
| 2013/0142583 | A1 | 6/2013 | Arai et al. | |
| 2014/0169892 | A1* | 6/2014 | Hecht | ....................... B23C 5/10 407/42 |
| 2018/0065191 | A1 | 3/2018 | Hecht | |
| 2019/0262910 | A1 | 8/2019 | Bonfiglio et al. | |
| 2019/0375029 | A1* | 12/2019 | Katagiri | ................. B23B 51/02 |
| 2020/0030894 | A1* | 1/2020 | Deeg | .................. B23B 51/0493 |
| 2021/0154747 | A1* | 5/2021 | Pabel | .................... B23B 51/00 |
| 2021/0213543 | A1* | 7/2021 | Kauper | ................. B23B 51/02 |
| 2021/0283696 | A1* | 9/2021 | Sterling | ................. B23B 51/06 |

FOREIGN PATENT DOCUMENTS

| | | | | | |
|---|---|---|---|---|---|
| JP | | 07164228 | A | * | 6/1995 |
| JP | | 2004261930 | A | * | 9/2004 |
| JP | | 4608933 | B2 | * | 1/2011 |
| JP | | 2012056055 | A | * | 3/2012 |
| JP | | 2014004671 | A | * | 1/2014 ............ B23B 51/02 |
| JP | | 2016112662 | A | * | 6/2016 |
| KR | | 102164828 | B1 | * | 10/2020 |
| WO | WO-2011102570 | A1 | | * | 8/2011 ............ B23K 11/02 |
| WO | WO 2012/070640 | | | | 5/2012 |
| WO | WO-2016147963 | A1 | | * | 9/2016 |
| WO | WO-2017137551 | A1 | | * | 8/2017 |
| WO | WO 2018/075921 | | | | 4/2018 |
| WO | WO 2018/079489 | | | | 5/2018 |

OTHER PUBLICATIONS

Description JPH07164228A (translation) obtained at https://worldwide.espacenet.com/ (last visited Jan. 20, 2023).*
International Search Report dated Jan. 13, 2020, issued in PCT counterpart application (No. PCT/IL2019/051010).
Written Opinion dated Jan. 13, 2020, issued in PCT counterpart application (No. PCT/IL2019/051010).

* cited by examiner

CUTTING HEAD HAVING TIP PORTION WITH RADIALLY EXTENDING FRONT CUTTING EDGES PROVIDED WITH BOTH NEGATIVE AND POSITIVE RAKE ANGLES, AND ROTARY CUTTING TOOL

RELATED APPLICATIONS

The present application claims priority to U.S. Provisional application No. 62/741,000, filed Oct. 4, 2018. The contents of the aforementioned application are incorporated by reference in their entirety.

FIELD OF THE INVENTION

The present invention relates to a cutting head having a tip portion with radially extending cutting edges and a rotary cutting tool having such cutting head, for use in metal cutting processes in general, and for drilling operations in particular.

BACKGROUND OF THE INVENTION

Within the field of cutting tools used in drilling operations, there are many examples of cutting heads having cutting edges configured to account for the increased wear at radially outer portions due to the relatively higher cutting speeds, and/or reduced stability at radially inner portions due to the relatively higher cutting forces.

U.S. Pat. No. 8,801,344 discloses a drill bit having at least one main cutting edge and at least one center cutting edge, wherein the drill bit comprises a longitudinal axis, and wherein the at least one main cutting edge and the at least one center cutting edge are each assigned a rake face. The drill bit is characterized in that the rake face assigned to the at least one center cutting edge has at least two part faces which as seen as perpendicular to the longitudinal axis of the drill bit form an obtuse angle with one another, so that the at least one center cutting edge comprises at least two part cutting edges.

WO 2018/075921 A1 discloses a drill including a plurality of lands that extend to a cutting edge, where adjacent lands are separated by flutes comprising a base contour arranged in a generally helical configuration along a centerline axis of a drill body. The drill also includes a plurality of contoured drill points each having a linear portion that extends towards an outer diameter of the drill body, and an arcuate portion that extends from the linear portion and towards a chisel of the drill body. The drill further includes a plurality of gash contours positioned within the plurality of flutes. The gash contours extend from the chisel of the drill body, and the gash contours are oblique to the base contours of the flutes.

WO 2018/079489 A1 discloses a cutting tool with a rod-shaped body, a cutting blade located at a first end of the body, and a groove that extends in a spiral from the cutting blade toward a second end side of the body. The cutting blade comprises a first blade intersecting with an axis of rotation when seen in front view, and a second blade extending from the first blade toward an outer peripheral surface of the body. The groove comprises a first thinning section located so as to connect to the first blade, and a second thinning section located so as to connect to the second blade. A thinning angle of the first thinning section is smaller than a thinning angle of the second thinning section.

It is an object of the present invention to provide an improved cutting head having radially outer cutting edges with greater wear resistance and radially inner cutting edges with increased stability and robustness.

It is also an object of the present invention to provide an improved cutting head having gashes adjacent the radially inner cutting edges which provide efficient chip evacuation.

It is a further object of the present invention to provide an improved cutting head capable of operating at high feed rates.

It is yet a further object of the present invention to provide an improved rotary cutting tool in which the cutting head is removably mounted to a shank.

SUMMARY OF THE INVENTION

In accordance with the present invention, there is provided a cutting head rotatable about a first axis in a direction of rotation, and comprising:

an intermediate portion having an integer number N, N≥2, circumferentially spaced apart peripheral surfaces, each peripheral surface having a leading edge, and the plurality of leading edges defining a cutting diameter; and a tip portion having an axially forwardmost tip point contained in the first axis and N front surfaces, each front surface having a radially extending front cutting edge which comprises an outer cutting edge extending radially inwardly from one of the leading edges and an inner cutting edge extending radially inwardly from said outer cutting edge, each inner cutting edge adjoining its associated outer cutting edge at a cutting edge transition point, wherein:

in a cross-section taken in a first vertical plane parallel to the first axis and intersecting any one of the outer cutting edges, an outer rake surface adjacent to said outer cutting edge is inclined at a positive outer rake angle; and in a cross-section taken in a second vertical plane parallel to the first axis and intersecting any one of the inner cutting edges, an inner rake surface adjacent to said inner cutting edge is inclined at a negative inner rake angle, wherein:

each outer rake surface is disposed on a head flute extending axially rearwardly from the tip portion and intersecting one of the leading edges; and each inner rake surface is disposed on a gash extending axially rearwardly from the tip portion and intersecting one of the head flutes, and wherein:

each gash has a gash path defined by a plurality of gash apex points from a series of cross-sections taken in planes perpendicular to the first axis and intersecting the gash along its axial extent;

each gash path extends to a gash path end point located a first distance axially rearward of the tip point; and the first distance is greater than thirty percent of the cutting diameter.

Also, in accordance with the present invention, there is provided a rotary cutting tool comprising the cutting head described above and a shank having a longitudinal axis, and N shank flutes circumferentially alternating with N lands.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
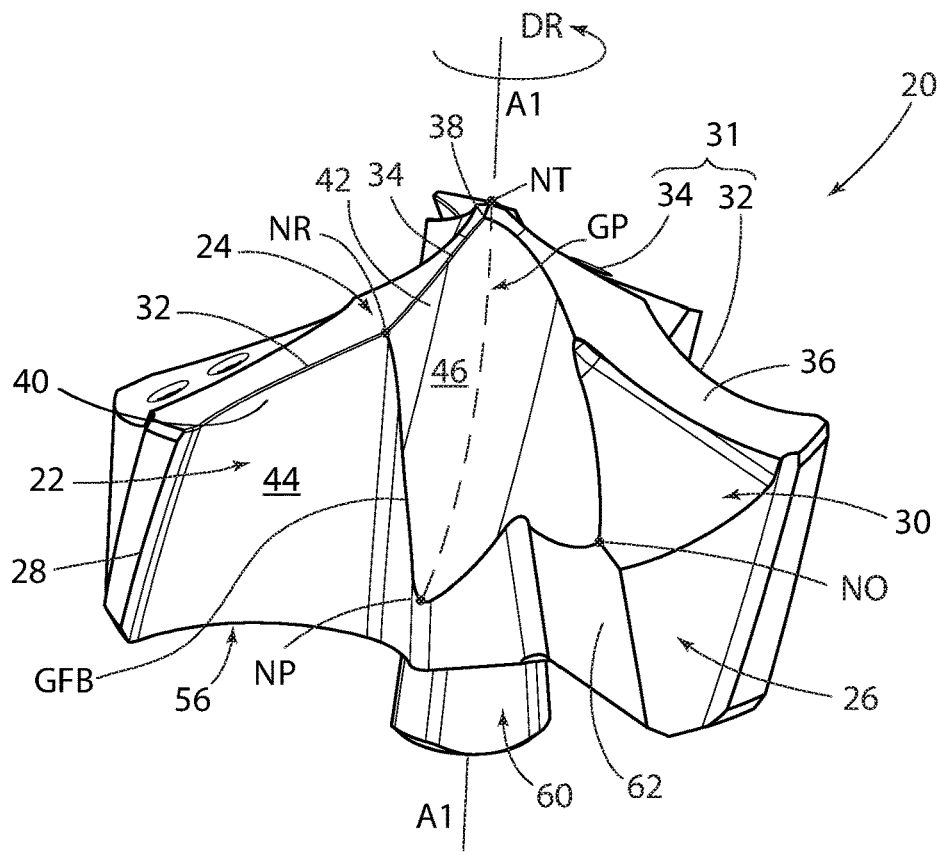
FIG. 1 is a perspective view of a cutting head in accordance with the present invention.
Figure 2:
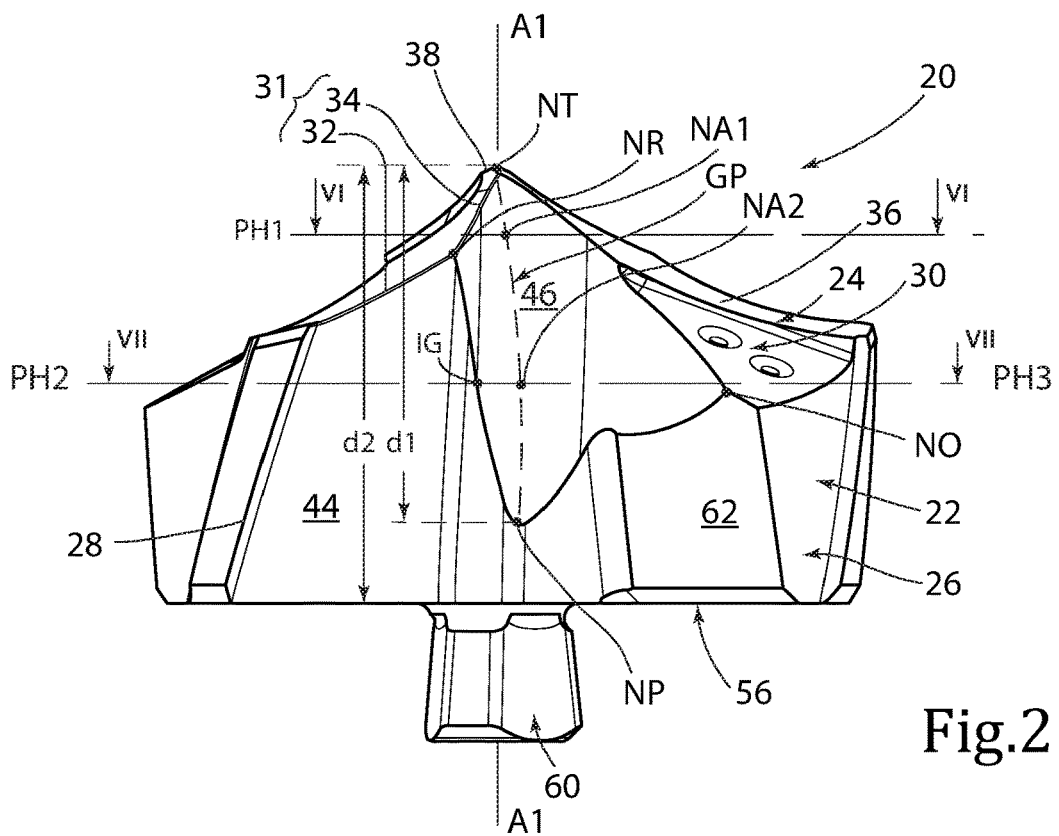
FIG. 2 is a side view of the cutting head shown in FIG. 1.
Figure 3:
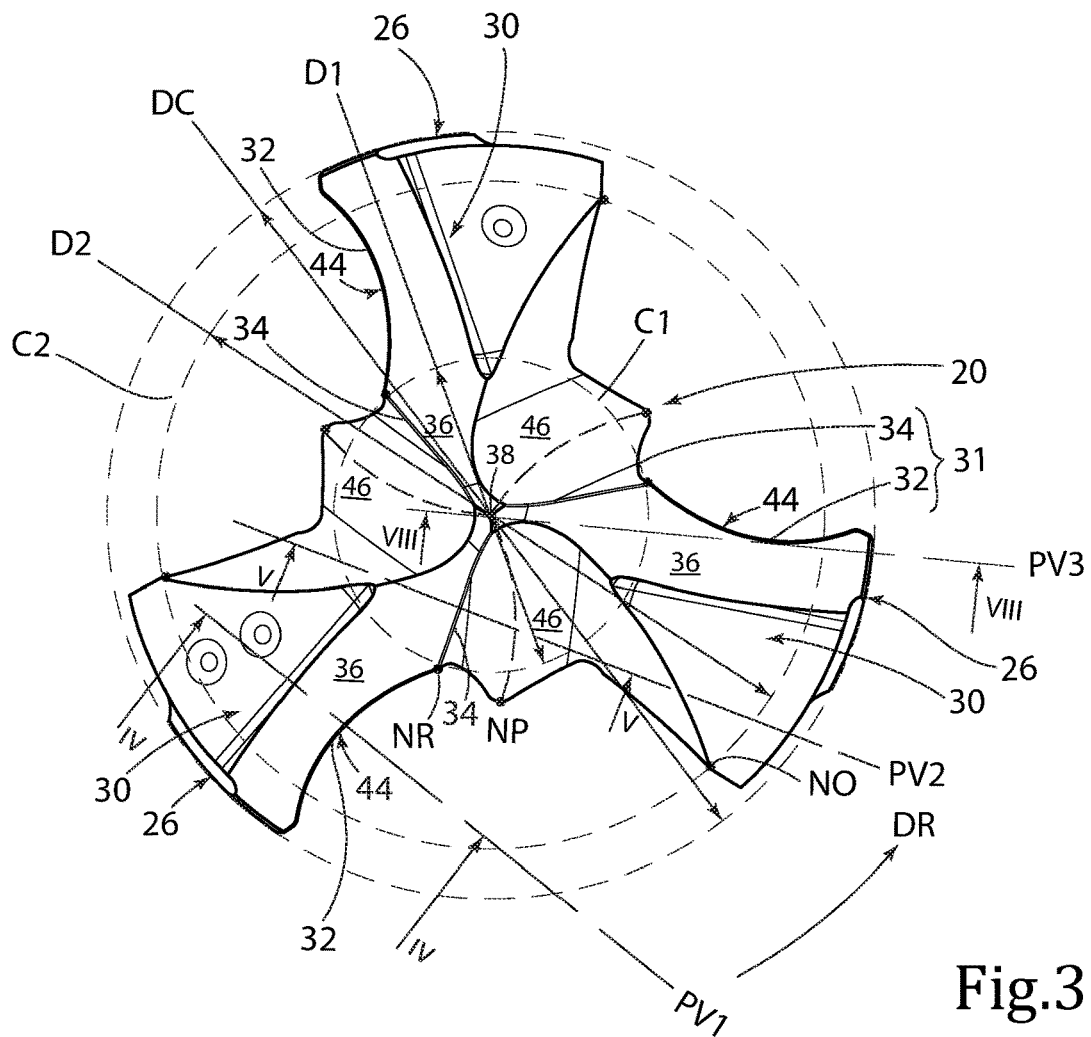
FIG. 3 is a top view of the cutting head shown in FIG. 1.

Attention is first drawn to FIGS. 1 to 3, showing a cutting head 20 which may be manufactured by form pressing and sintering a cemented carbide, such as tungsten carbide, and may be coated or uncoated.

According to the present invention, the cutting head 20 is rotatable about a first axis A1 in a direction of rotation DR, comprising an intermediate portion 22 and a tip portion 24.

As shown in FIGS. 1 to 3, the intermediate portion 22 has a plurality of N circumferentially spaced apart peripheral surfaces 26. Each peripheral surface 26 has a leading edge 28, and the plurality of leading edges 28 define a cutting diameter DC.

In some embodiments of the present invention, each leading edge 28 may extend opposite the direction of rotation DR as it extends axially rearwardly from the tip portion 24.

Also, in some embodiments of the present invention, each leading edge 28 may extend helically along the first axis A1.

As shown in FIGS. 1 to 3, the tip portion 24 has an axially forwardmost tip point NT contained in the first axis A1 and a plurality of N front surfaces 30, each front surface 30 having a radially extending front cutting edge 31 which comprises an outer cutting edge 32 extending radially inwardly from one of the leading edges 28 and an inner cutting edge 34 extending radially inwardly from said outer cutting edge 32.

Each front surface 30 also includes a clearance surface 36 adjacent its associated outer and inner cutting edges 32, 34, and each inner cutting edge 34 adjoins its associated outer cutting edge 32 at a cutting edge transition point NR. As discussed below, the outer cutting edge 32 is associated with a positive rake angle while the inner cutting edge 34 is associated with a negative rake angle. Thus, the cutting edge transition point NR corresponds to the point on the front cutting edge 31 where the rake angle changes from a positive rake to a negative rake, while traveling along the front cutting edge 31 in a radially inward direction towards the forwardmost tip point NT.

As shown in FIG. 3, the plurality of cutting edge transition points NR define an imaginary first circle C1 having a first diameter D1.

In some embodiments of the present invention, the first diameter D1 may be greater than thirty percent of the cutting diameter DC, i.e. D1>0.30*DC.

As shown in FIGS. 1 to 3, the tip portion 24 may also include a plurality of N chisel edges 38, each chisel edge 38 being formed by two adjacent clearance surfaces 36 and extending radially away from the tip point NT to one of the inner cutting edges 34.

It should be appreciated throughout the description and claims, that N is an integer that is at least two, i.e., N≥2.

In some embodiments of the present invention, the cutting head 20 may exhibit N-fold rotational symmetry about the first axis A1.

Also, in some embodiments of the present invention, N may equal 3, and the intermediate portion 22 may have three leading edges 28, and the tip portion 24 may have three outer cutting edges 32 and three inner cutting edges 34.

Having three outer cutting edges 32 and three inner cutting edges 34 enables the cutting head 20 to operate at high feed rates.

Figure 4:
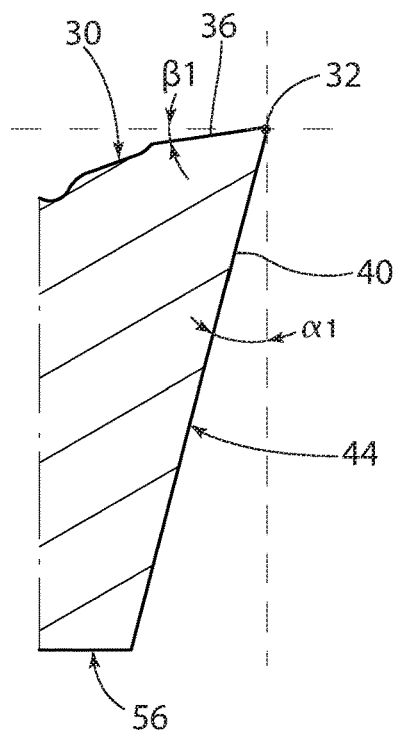
FIG. 4 is a cross-sectional view of the cutting head shown in FIG. 3, taken along the line IV-IV.

As shown in FIG. 4, in a cross-section taken in a first vertical plane PV1 parallel to the first axis A1 and intersecting any one of the outer cutting edges 32, an outer rake surface 40 adjacent to said outer cutting edge 32 is inclined at a positive outer rake angle $\alpha 1$.

It should be appreciated that the expression "vertical plane", as used in the present application, refers to any plane that is parallel to the first axis A1, though not necessarily containing the first axis A1.

It should be appreciated throughout the description and claims, that the term "rake angle" refers to the acute angle formed between a rake surface and an imaginary reference line parallel to the first axis A1.

It should also be appreciated that the outer cutting edges 32 are susceptible to greater wear than the inner cutting edges 34 due to their relatively higher cutting speeds, and that configuring the outer rake angle $\alpha 1$ to be positive reduces wear on the outer cutting edges 32, thus prolonging the operative life thereof.

As shown in FIG. 3, the plurality of outer rake surfaces 40 face the direction of rotation DR.

In some embodiments of the present invention, in a cross-section taken in any plane parallel to the first axis A1 and intersecting any one of the outer cutting edges 32, the outer rake surface 40 adjacent to said outer cutting edge 32 may be inclined at a positive outer rake angle $\alpha 1$.

Also, in some embodiments of the present invention, in the cross-section taken in the first vertical plane PV1, the positive outer rake angle $\alpha 1$ may have a magnitude of greater than 5 degrees, while in some embodiments the positive outer rake angle $\alpha 1$ may have a magnitude of greater than 10 degrees.

As shown in FIG. 4, in the cross-section taken in the first vertical plane PV1, the clearance surface 36 is inclined at a positive outer clearance angle $\beta 1$.

It should be appreciated throughout the description and claims, that the term "clearance angle" refers to the acute angle formed between a clearance surface and an imaginary reference line perpendicular to the first axis A1.

Figure 5:
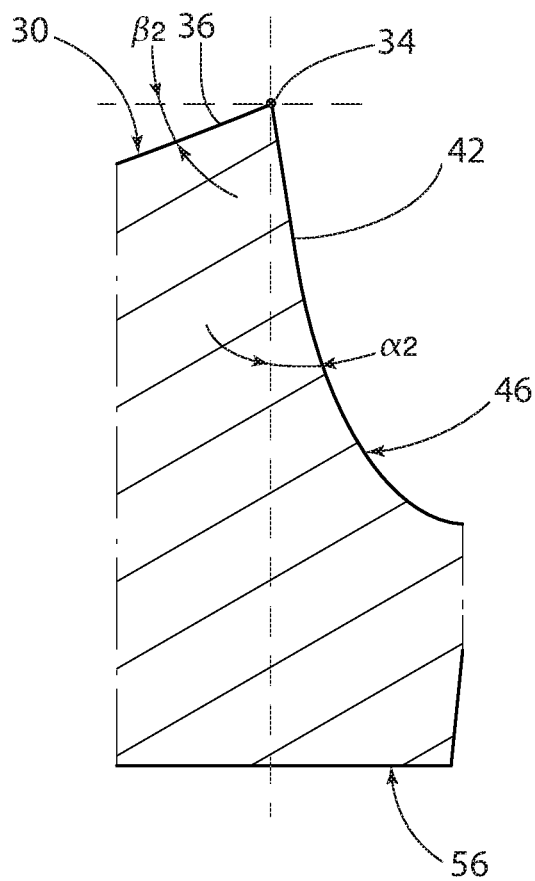
FIG. 5 is a cross-sectional view of the cutting head shown in FIG. 3, taken along the line V-V.

As shown in FIG. 5, in a cross-section taken in a second vertical plane PV2 parallel to the first axis A1 and intersecting any one of the inner cutting edges 34, an inner rake surface 42 adjacent to said inner cutting edge 34 is inclined at a negative inner rake angle $\alpha 2$.

It should be appreciated that the inner cutting edges 34 are susceptible to greater impact forces than the outer cutting edges 32 due to their relatively lower cutting speeds, especially at high feed rates, and that configuring the inner rake angle α2 to be negative increases the stability and robustness of the inner cutting edges 34, thus prolonging the operative life thereof.

As shown in FIG. 3, the plurality of inner rake surfaces 42 face the direction of rotation DR.

In some embodiments of the present invention, in a cross-section taken in any plane parallel to the first axis A1 and intersecting any one of the inner cutting edges 34, the inner rake surface 42 adjacent to said inner cutting edge 34 may be inclined at a negative inner rake angle α2.

Also, in some embodiments of the present invention, in the cross-section taken in the second vertical plane PV2, the negative inner rake angle α2 may have a magnitude of greater than 5 degrees.

As shown in FIG. 5, in the cross-section taken in the second vertical plane PV2, the clearance surface 36 is inclined at a positive inner clearance angle β2.

In some embodiments of the present invention, the inner clearance angle β2 may be greater than the outer clearance angle β1, i.e. β2>β1.

Also, in some embodiments of the present invention, the inner clearance angle β2 may continuously increase when measured at a series of parallel cross-sections taken in parallel vertical planes located progressively closer to the first axis A1.

Configuring the inner clearance angle β2 to continuously increase radially inwardly, reduces the high cutting and impact forces typically associated with very low cutting speeds, occurring towards the cutting head's center.

As shown in FIGS. 1 to 3, each outer rake surface 40 is disposed on a head flute 44 extending axially rearwardly from the tip portion 24 and intersecting one of the leading edges 28, and each inner rake surface 42 is disposed on a gash 46 extending axially rearwardly from the tip portion 24 and intersecting one of the head flutes 44.

Also, as shown in FIGS. 1 to 3, each gash 46 has a gash path GP defined by a plurality of gash apex points from a series of parallel cross-sections taken in parallel planes, each of which is perpendicular to the first axis A1 and intersects the gash 46 along its axial extent.

It should be appreciated throughout the description and claims, that for each cross-section taken in a plane perpendicular to the first axis A1 and intersecting the gash 46, an associated gash apex point is located at the midpoint of a segment of the associated profile having a minimum radius, the minimum radius having a tolerance of +0.20/−0.00 mm.

According to the present invention, as shown in FIG. 2, each gash path GP extends to a gash path end point NP located a first distance d1 axially rearward of the tip point NT, and the first distance d1 is greater than thirty percent of the cutting diameter DC, i.e. d1>0.30*DC.

Configuring each gash path GP to have an extensive axial length, by way of the first distance d1 being greater than thirty percent of the cutting diameter DC, advantageously contributes to increased gash volume and efficient chip evacuation.

In some embodiments of the present invention, the first distance d1 may be greater than forty percent of the cutting diameter DC, i.e. d1>0.40*DC.

Also, in some embodiments of the present invention, each gash path GP may extend in a direction opposite to the direction of rotation DR as it extends axially rearwardly from the tip portion 24.

Further, in some embodiments of the present invention, each gash path end point NP may be located radially further from the first axis A1 than any of the cutting edge transition points NR.

Configuring each gash path end point NP to be located radially outward of the cutting edge transition points NR promotes improved chip development along the gash 46.

Figure 6:
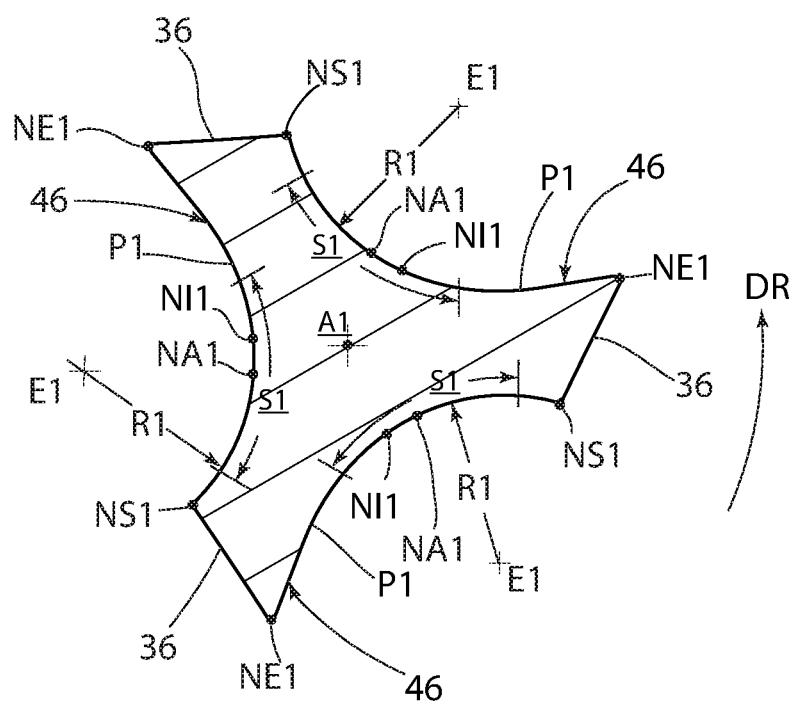
FIG. 6 is a cross-sectional view of the cutting head shown in FIG. 2, taken along the line VI-VI.

As shown in FIG. 6, in a cross-section taken in a first horizontal plane PH1 perpendicular to the first axis A1 and intersecting the plurality of inner cutting edges 34, each gash 46 may have a concave shaped first profile P1.

In some embodiments of the present invention, each first profile P1 may be continuously curved.

Configuring each first profile P1 to be continuously curved, promotes improved chip development in the associated gash region.

As shown in FIG. 6, the first profile P1 has a minimum first radius R1 measured along a first segment S1 thereof, the first segment S1 containing a first gash apex point NA1.

In some embodiments of the present invention, the minimum first radius R1 may be greater than six percent of the cutting diameter DC, i.e. R1>0.06*DC.

Configuring each first profile P1 to have its minimum first radius R1 greater than six percent of the cutting diameter DC promotes smooth chip flow along the gash 46, and a reduced risk of chip clogging.

Also, configuring each first profile P1 to have its minimum first radius R1 greater than six percent of the cutting diameter DC increases the core strength of the tip portion 24.

In some embodiments of the present invention, the minimum first radius R1 may preferably be greater than eight percent of the cutting diameter DC, i.e. R1>0.08*DC.

Also, in some embodiments of the present invention, the minimum first radius R1 may be less than fifteen percent of the cutting diameter DC, i.e. R1<0.15*DC.

As shown in FIG. 6, each first profile P1 may have a radially innermost first point NI1 contained in its first segment S1.

In some embodiments of the present invention, the first segment S1 may subtend an angle of greater than 15 degrees about a first center point E1 of the minimum first radius R1.

Configuring each first profile P1 to have its radially innermost first point NI1 in the first segment S1, enables more efficient circumferential spacing of the plurality of gashes 46, thus enabling cutting head configurations where N is greater than 2, i.e. N>2.

Figure 7:
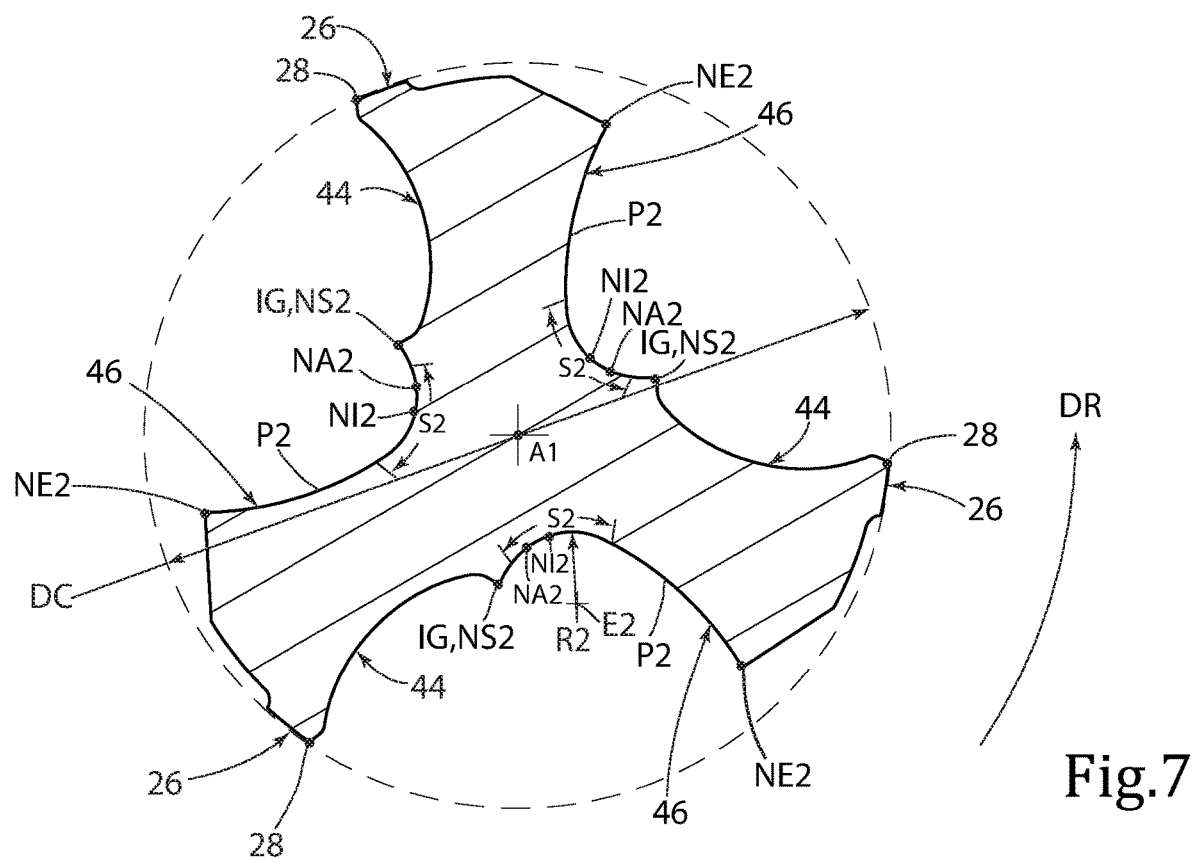
FIG. 7 is a cross-sectional view of the cutting head shown in FIG. 2, taken along the line VII-VII.

As shown in FIG. 7, in a cross-section taken in a second horizontal plane PH2 perpendicular to the first axis A1 and intersecting the plurality of leading edges 28, each gash 46 may have a concave shaped second profile P2.

In some embodiments of the present invention, each second profile P2 may be continuously curved.

Configuring each second profile P2 to be continuously curved, promotes improved chip development in the associated gash region.

As shown in FIG. 7, the second profile P2 has a minimum second radius R2 measured along a second segment S2 thereof, the second segment S2 containing a second gash apex point NA2.

In some embodiments of the present invention, the minimum second radius R2 may be greater than six percent of the cutting diameter DC, i.e. R2>0.06*DC.

Configuring each second profile P2 to have its minimum second radius R2 greater than six percent of the cutting diameter DC promotes smooth chip flow along the gash 46, and a reduced risk of chip clogging.

In some embodiments of the present invention, the minimum second radius R2 may preferably be greater than eight percent of the cutting diameter DC, i.e. R2>0.08*DC.

Also, in some embodiments of the present invention, the minimum second radius R2 may be less than fifteen percent of the cutting diameter DC, i.e. R2<0.15*DC.

It should be appreciated that the minimum second radius R2 may have a range of between eighty five and one hundred and fifteen percent of the minimum first radius R1, i.e. 0.85*R1<R2<1.15*R1.

As shown in FIG. 7, each second profile P2 may have a radially innermost second point NI2 contained in its second segment S2.

In some embodiments of the present invention, the second segment S2 may subtend an angle of greater than 15 degrees about a second center point E2 of the minimum second radius R2.

Configuring each second profile P2 to have its radially innermost second point NI2 in the second segment S2, enables more efficient circumferential spacing of the plurality of gashes 46, thus enabling cutting head configurations where N is greater than 2, i.e. N>2.

For embodiments of the present invention in which N is equal to 3, as shown in FIGS. 6 and 7, the first profile P1 may form a pursuit curve having a first start point NS1 located rotationally ahead of a first end point NE1, and the second profile P2 may form a pursuit curve having a second start point NS2 located rotationally behind a second end point NE2. Thus, the first profile P1 may be continuously curved along its entire length, between the first start point NS1 and the first end point NE1.

It should be appreciated that use of the term "pursuit curve" throughout the description and claims refers to the curve shape described in https://en.wikipedia.org/wiki/Pursuit_curve, retrieved Jul. 2, 2019, the curve being traced by a pursuer in pursuit of a pursuee, with the pursuee moving in a straight line and always on the pursuer's tangent.

As seen in FIG. 1, the head flute 44 and its associated gash 46 meet along a gash-flute boundary line GFB. As shown in FIG. 7, in a cross-section taken in a third horizontal plane PH3 perpendicular to the first axis A1 and intersecting the plurality of leading edges 28, each gash 46 intersects its associated head flute 44 at a gash-flute intersection point IG, the gash-flute boundary line GFB, constituting a collection of such gash-flute intersection points IG at various such horizontal planes.

In some embodiments of the present invention, each such gash-flute intersection point IG, except at the associated cutting edge transition point NR itself, may be located rotationally ahead of its associated cutting edge transition point NR.

Also, in some embodiments of the present invention, the second and third horizontal planes PH2, PH3 may be coplanar.

Figure 8:
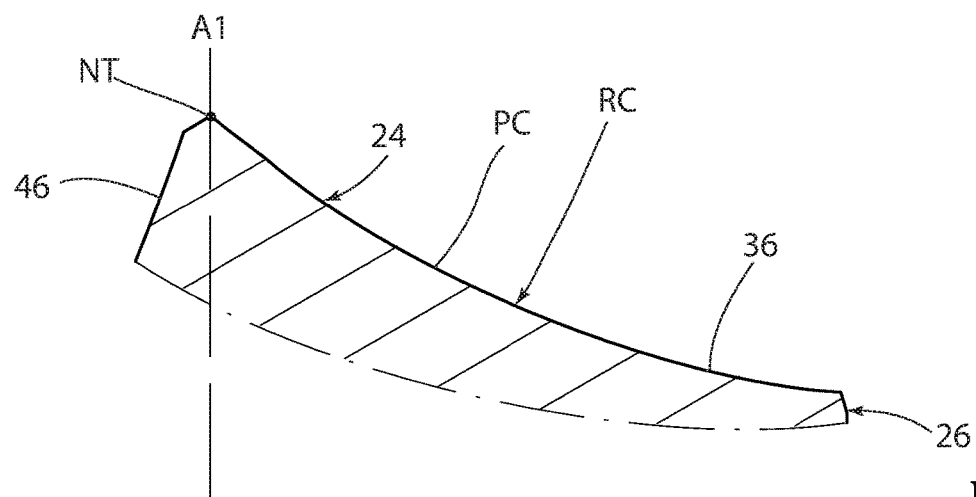
FIG. 8 is a cross-sectional view of the cutting head shown in FIG. 3, taken along the line VIII-VIII.

As shown in FIG. 8, in a cross-section taken in a third vertical plane PV3 containing the first axis A1 and intersecting the clearance surface 36, the clearance surface 36 may have a concave shaped clearance profile PC.

In some embodiments of the present invention, each concave shaped clearance profile PC may have a clearance radius RC having a range of between fifty and one hundred and fifty percent of the cutting diameter DC, i.e. 0.50*DC<RC<1.50*DC.

Also, in some embodiments of the present invention, each concave shaped clearance profile PC may be continuously curved and extend step-free to the first axis A1.

Figure 9:
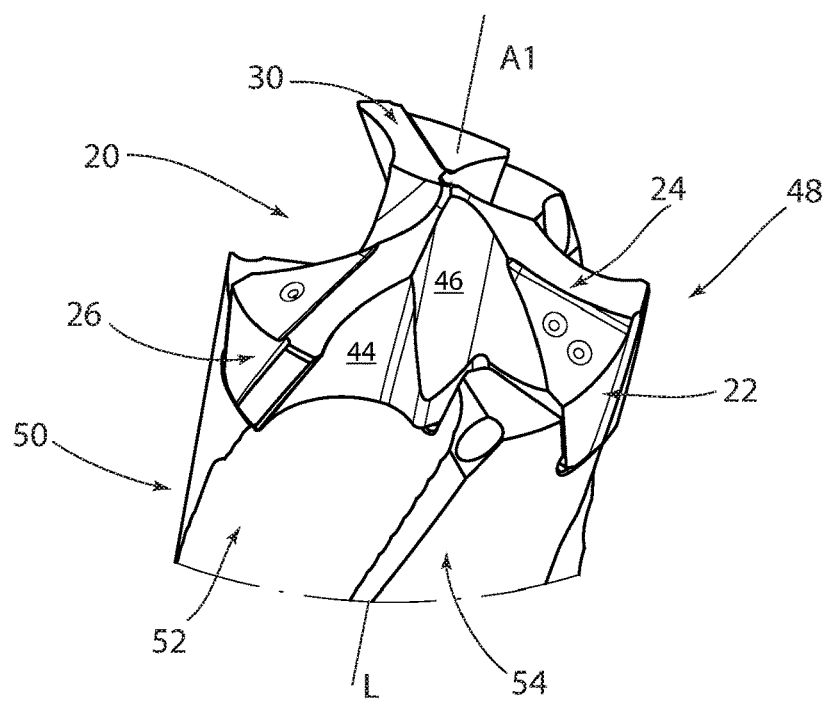
FIG. 9 is a perspective view of a rotary cutting tool in accordance with the present invention.
Figure 10:
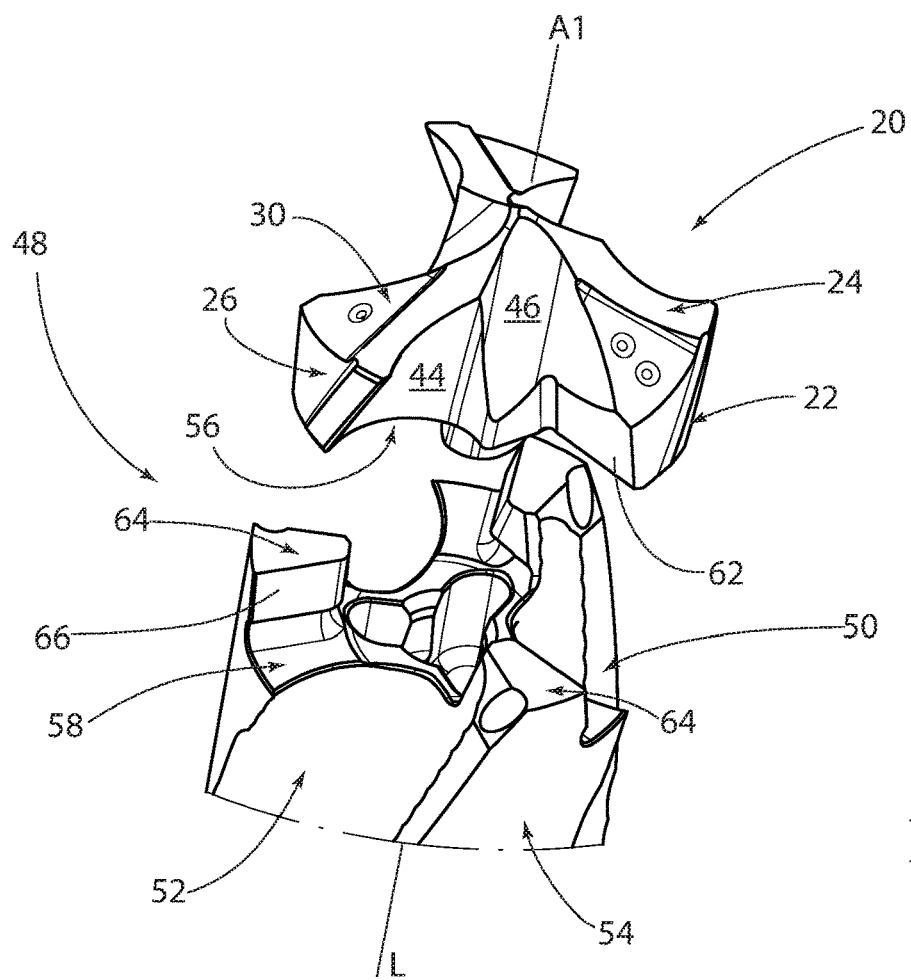
FIG. 10 is an exploded view of the rotary cutting tool shown in FIG. 9.

Attention is now drawn to FIGS. 9 and 10, showing a rotary cutting tool 48 according to the present invention, comprising the cutting head 20 and a shank 50 having a longitudinal axis L.

The shank 50 has N shank flutes 52 circumferentially alternating with N lands 54, and each shank flute 52 may extend helically along the longitudinal axis L.

As shown in FIGS. 9 and 10, the cutting head 20 may have an axially rearward facing bottom surface 56, the shank 50 may have a support surface 58 transverse to the longitudinal axis L, and the cutting head 20 may be removably mounted to the shank 50 with the bottom surface 56 in contact with the support surface 58.

Configuring the cutting head 20 to be removably mounted to the shank 50 enables the cutting head 20 to be manufactured from a suitably hard material, such as tungsten carbide, and the shank 50 to be manufactured from a less hard and less expensive material, such as high-speed steel. The shank 50 may be reusable following disposal of a worn or damaged cutting head 20.

In some embodiments of the present invention, each head flute 44 may intersect the bottom surface 56 and cooperate with one of the shank flutes 52.

Also, in some embodiments of the present invention, the bottom surface 56 may be perpendicular to the first axis A1, the support surface 58 may be perpendicular to the longitudinal axis L, and the first axis A1 may be coaxial with the longitudinal axis L.

As shown in FIG. 2, the bottom surface 56 is located a second distance d2 axially rearward of the tip point NT, and the first distance d1 may be greater than seventy percent of the second distance d2, i.e. d1>0.70*d2.

In some embodiments of the present invention, the cutting head 20 may include a mounting protuberance 60 extending axially rearwardly from the bottom surface 56.

In other embodiments of the present invention (not shown), the cutting head 20 and the shank 50 may be integral parts of a unitary one-piece construction, and each head flute 44 may merge with one of the shank flutes 52.

As shown in FIGS. 9 to 10, the intermediate portion 22 of the cutting head 20 may include a plurality of N torque transmission surfaces 62 facing opposite the direction of rotation DR, the shank 50 may include a plurality of N drive protuberances 64, with each drive protuberance 64 having a drive surface 66 facing the direction of rotation DR, and each torque transmission surface 62 may be in contact with one of the drive surfaces 66.

In some embodiments of the present invention, the first distance d1 may be less than ninety percent of the second distance d2, i.e. d1<0.90*d2.

For embodiments of the present invention in which N is equal to 3, configuring the first distance d1 to be less than ninety percent of the second distance d2, provides sufficient space for the plurality of drive protuberances 64 to engage the cutting head 20, without obstructing smooth chip flow between the gashes 46 and the shank flutes 52.

In some embodiments of the present invention, each torque transmission surface 62 may intersect one of the peripheral surfaces 26.

For embodiments of the present invention in which N is equal to 3, as shown in FIGS. 1 to 3, each gash 46 may intersect one of the torque transmission surfaces 62 at a radially outermost gash point NO.

In some embodiments of the present invention, as shown in FIG. 3, the three radially outermost gash points NO may define an imaginary second circle C2 having a second diameter D2 greater than seventy percent of the cutting diameter DC, i.e. D2>0.70*DC.

Configuring the imaginary second circle C2 to have a second diameter D2 greater than seventy percent of the cutting diameter DC, advantageously contributes to increased gash volume and efficient chip evacuation.

Although the present invention has been described to a certain degree of particularity, it should be understood that various alterations and modifications could be made without departing from the spirit or scope of the invention as hereinafter claimed.

What is claimed is:

1. A cutting head (20) rotatable about a first axis (A1) in a direction of rotation (DR), the cutting head having three-fold rotational symmetry about the first axis (A1) and comprising:
   an intermediate portion (22) having an integer number N=3 circumferentially spaced apart peripheral surfaces (26), each peripheral surface (26) having a leading edge (28), and the plurality of leading edges (28) defining a cutting diameter (DC); and
   a tip portion (24) having an axially forwardmost tip point (NT) contained in the first axis (A1) and N front surfaces (30), each front surface (30) having a radially extending front cutting edge (31) which comprises an outer cutting edge (32) extending radially inwardly from one of the leading edges (28) and an inner cutting edge (34) extending radially inwardly from said outer cutting edge (32), each front surface (30) including a clearance surface (36) adjacent its associated outer and inner cutting edges (32, 34), each inner cutting edge (34) adjoining its associated outer cutting edge (32) at a cutting edge transition point (NR),
   wherein:
   in a first cross-section taken parallel to the first axis (A1) and intersecting any one of the outer cutting edges (32), an outer rake surface (40) adjacent to said outer cutting edge (32) is inclined at a positive outer rake angle ($\alpha 1$); and
   in any second cross-section taken parallel to the first axis (A1) and intersecting any one of the inner cutting edges (34), an inner rake surface (42) adjacent to said inner cutting edge (34) is inclined at a negative inner rake angle ($\alpha 2$),
   wherein:
   each outer rake surface (40) is disposed on a head flute (44) extending axially rearwardly from the tip portion (24) and intersecting one of the leading edges (28);
   the cutting head (20) has an axially rearward facing bottom surface (56), and each head flute (44) intersects the bottom surface (56);
   each inner rake surface (42) is disposed on a gash (46) extending axially rearwardly from the tip portion (24) and intersecting one of the head flutes (44),
   each gash (46) has a gash path (GP) defined by a plurality of gash midpoints from a series of cross-sections taken in planes perpendicular to the first axis (A1) and intersecting the gash (46) along its axial extent, each gash midpoint being located at a midpoint of a segment of the associated cross-section having a minimum radius;
   each gash path (GP) extends to a gash path end point (NP) located a first distance (d1) axially rearward of the forwardmost tip point (NT);
   the first distance (d1) is greater than thirty percent of the cutting diameter (DC); and
   each gash path end point (NP) is located radially further from the first axis (A1) than any one of the cutting edge transition points (NR);
   wherein:
   in a cross-section taken in a first horizontal plane (PH1) perpendicular to the first axis (A1) and intersecting the plurality of inner cutting edges (34), each gash (46) has a concave shaped first profile (P1) which is continuously curved along the entire length of said profile (P1);
   the first profile (P1) has a minimum first radius (R1) measured along a first segment (S1) thereof, the first segment (S1) containing a first gash midpoint (NA1); and
   the minimum first radius (R1) is greater than six percent of the cutting diameter (DC), and
   wherein:
   the bottom surface (56) is perpendicular to the first axis (A1) and located a second distance (d2) axially rearward of the tip point (NT),
   the first distance (d1) is greater than seventy percent of the second distance (d2), and
   the first distance (d1) is less than ninety percent of the second distance (d2).

2. The cutting head (20) according to claim 1, wherein: each first profile (P1) has a radially innermost first point (NI1) contained in its first segment (S1).

3. The cutting head (20) according to claim 1, wherein: in a cross-section taken in a second horizontal plane (PH2) perpendicular to the first axis (A1) and intersecting the plurality of leading edges (28), each gash (46) has a concave shaped second profile (P2), the second profile (P2) has a minimum second radius (R2) measured along a second segment (S2) thereof, the second segment (S2) containing a second gash midpoint (NA2); and
the minimum second radius (R2) is greater than six percent of the cutting diameter (DC).

4. The cutting head (20) according to claim 3, wherein: each second profile (P2) has a radially innermost second point (NI2) contained in its second segment (S2).

5. The cutting head (20) according to claim 3, wherein: each second profile (P2) is continuously curved.

6. The cutting head (20) according to claim 1, wherein: in any cross-section taken in a vertical plane parallel to the first axis (A1) and intersecting any one of the outer cutting edges (32), the outer rake surface (40) adjacent to said outer cutting edge (32) is inclined at a positive outer rake angle ($\alpha 1$).

7. The cutting head (20) according to claim 1, wherein: in said any second cross-section, the negative inner rake angle ($\alpha 2$) has a magnitude of greater than 5 degrees.

8. The cutting head (20) according to claim 1, wherein: each gash path (GP) extends in a direction opposite the direction of rotation (DR), as it extends axially rearwardly from the tip portion (24).

9. The cutting head (20) according to claim 1, wherein: in a third cross-section containing the first axis (A1) and intersecting the clearance surface (36), the clearance surface (36) has a concave shaped clearance profile (PC).

10. The cutting head (20) according to claim 9, wherein: each concave shaped clearance profile (PC) is continuously curved and extends step-free to the first axis (A1).

11. The cutting head (20) according to claim 1, wherein: the tip portion (24) includes N chisel edges (38), and each chisel edge (38) is formed by two adjacent ones of said N clearance surfaces (36) and extends radially away from the tip point (NT) to one of the inner cutting edges (34).

12. A rotary cutting tool (48) comprising:

the cutting head (20) according to claim 1; and a shank (50) having a longitudinal axis (L), and N shank flutes (52) circumferentially alternating with N lands (54).

13. The rotary cutting tool (48) according to claim 12, wherein:

the shank (50) has a support surface (58) transverse to the longitudinal axis (L), and the cutting head (20) is removably mounted to the shank (50) with the bottom surface (56) in contact with the support surface (58).

14. The cutting head (20) according to claim 1, wherein:

in the first cross-section, the clearance surface (36) is inclined at a positive outer clearance angle ($\beta 1$), in the second cross-section, the clearance surface (36) is inclined at a positive inner clearance angle ($\beta 2$), and the inner clearance angle ($\beta 2$) is greater than the outer clearance angle ($\beta 1$).

15. The cutting head (20) according to claim 14, wherein: the inner clearance angle ($\beta 2$) continuously increases when measured at a series of parallel cross-sections taken in parallel vertical planes located progressively closer to the first axis (A1).

16. The cutting head (20) according to claim 1, wherein:

the cutting edge transition point (NR) is located at the juncture of the clearance surface (36), the head flute (44) and the gash (46); and the inner cutting edge (34) extends for the full length of a boundary between the clearance surface (36) and the gash (46).

17. The cutting head (20) according to claim 1, wherein:

the plurality of cutting edge transition points (NR) define an imaginary first circle (C1) having a first diameter (D1), and the first diameter (D1) is greater than thirty percent of the cutting diameter (DC).

18. The cutting head (20) according to claim 1, wherein:

the cutting head (20) includes a central mounting protuberance (60) intersected by the first axis (A1) and extending axially rearwardly from the bottom surface (56).

19. The cutting head (20) according to claim 1, wherein:

from an associated leading edge (28), and toward the tip point NT, points along each main cutting edge (31), increase in distance in both an axially forward direction and a radially inward direction.

20. The cutting head (20) according to claim 1, wherein:

the intermediate portion (22) of the cutting head (20) includes a plurality of N torque transmission surfaces (62) facing opposite the direction of rotation (DR).

21. The cutting head (20) according to claim 20, wherein: each gash (46) intersects one of the torque transmission surfaces (62) at a radially outermost gash point (NO).

22. The cutting head (20) according to claim 21, wherein:

the three radially outermost gash points (NO) define an imaginary second circle (C2) having a second diameter (D2) greater than seventy percent of the cutting diameter (DC).

* * * * *